No. 606,696. Patented July 5, 1898.
G. B. WAITE.
BEAM CONSTRUCTION FOR BUILDINGS.
(Application filed Mar. 12, 1897.)
(No Model.)
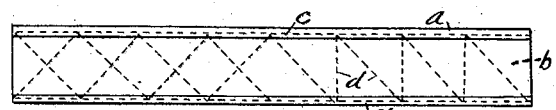
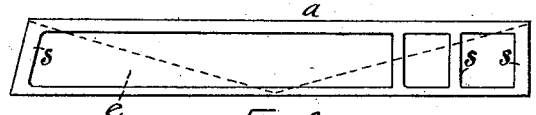
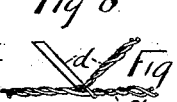
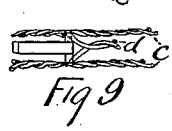
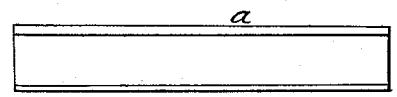
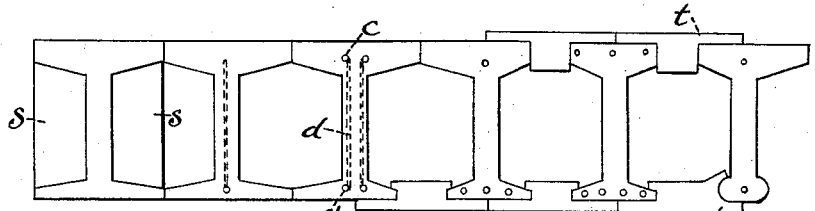
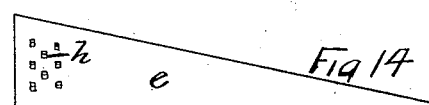
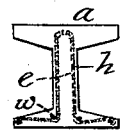
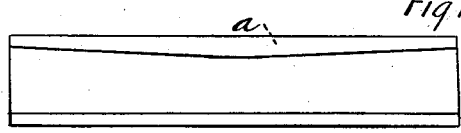
WITNESSES:
Andrew Gillies
Otto Wilhelms
Guy B. Waite
INVENTOR

UNITED STATES PATENT OFFICE.

GUY B. WAITE, OF HOBOKEN, NEW JERSEY.

BEAM CONSTRUCTION FOR BUILDINGS.

SPECIFICATION forming part of Letters Patent No. 606,696, dated July 5, 1898.

Application filed March 12, 1897. Serial No. 627,163. (No model.)

*To all whom it may concern:*

Be it known that I, GUY BENNETT WAITE, a citizen of the United States, residing at Hoboken, in the county of Hudson and State of New Jersey, have invented a new and useful Construction, of which the following is a specification.

My invention relates to a composite beam or girder to be used in building construction, which beam or girder is to be composed of two or more different kinds of materials united together to form one solid mass. One of the materials composing the beam or girder is some metal having high values for resisting stresses, and the other material or materials are substances capable of being applied to these metallic parts and forming both protecting and strengthening members to the beam.

The objects of this invention are to obtain a beam which is protected against oxidation and destruction by heat and to permit the smallest possible sections of metallic materials to be used in proportioning every part of the beam or girder throughout its entire length to exactly take the stresses imposed when the beam or girder is loaded.

The material which surrounds the metallic web and chord members of the beam or girder stiffens these members and enables the smallest sections to withstand compressive stresses and the tendency to buckle; also, to a greater or less extent the former material composes the main compressive members to the beam or girder, the main shearing and tensional stresses being taken by the metallic members. The beam is so made that it can be manufactured and finished in a factory ready for use in a building or in a foundation. The beam or girder is preferably made with a section which gives the maximum of strength compared with the weight of the beam—i. e., I-shaped sections.

All parts of the beam can be tied together by a webwork of metallic members, which serve to prevent the breaking of the outer materials composing the beam and if such parts should become broken to prevent them from becoming separated and useless as compression members.

The construction of my beam or girder is illustrated in the accompanying drawings, in which—

Figure 1 is a side elevation, and Fig. 2 is an end view, of a typical beam or girder.

$c$ $c'$ are respectively the upper and the lower metallic chords.

$d$ are the metallic counter and web members, which connect with the top and the bottom metallic chords of the beam.

$c'$, Fig. 1, is for the purpose of resisting the tensional stresses in the lower flange of the beam and will have the greatest strength at the center of the beam when the beam is to be loaded with a uniformly-distributed load and will diminish in strength toward the ends of the beam.

Members $d$ in Fig. 1 are principally for purposes of conveying the shearing stresses to which the beam will be subjected and will be smallest in a beam intended for a uniformly-distributed load at the center of the beam and will gradually increase in strength toward its ends.

$c'$ in Fig. 1 is intended to carry but a small proportion of the compression in the upper flange of the beam and is used mainly for tying the beam together and for distributing the stresses to members $d$ and to the main part of the flange $a$, Fig. 1.

$a$, Fig. 1, is a composition which may be formed of a concrete, of a strong cement-mortar, a composition of clay, of plaster-of-paris, or of any similar substance capable of uniting with the metallic parts and forming one continuous solid tile.

As shown in Fig. 17, the flange $a$, Fig. 1, can be proportioned to exactly take the stresses throughout its entire length by increasing or decreasing the sectional area—i. e., increasing or decreasing the thickness of the flange to correspond with the flange stresses.

The part $b$, Fig. 1, composing a part of the web of the beam and the external covering of the lower flange, is of substances similar to that described for $a$, Fig. 1. In some cases where the loads to be carried by the beam are very small and the parts $b$ and $a$, Figs. 1 and 2, are ample to carry the entire stresses coming on the beam in those parts the metallic members $c$ and $d$, Figs. 1 and 2, may be entirely omitted and metallic cord $c'$, Fig. 1, receive the tensional stresses directly from $b$, Figs. 1 and 2. It is, however, desirable to use light metallic members $c$ and $d$, Figs. 1 and 2, even when the material composing $a$ and $b$ are alone sufficient to distribute the stresses coming in those parts for the purposes of insuring a perfect tie to the finished beam and to prevent the exterior parts from becoming broken when severely used.

Fig. 11 shows the form of a section with the lower flange omitted. A solid square or rectangular section could be used in place of the sections here shown, but would add considerable weight to the beam without materially increasing its strength.

Fig. 3 is a side elevation, and Fig. 4 is an end view, of a beam similar in construction to Figs. 1 and 2, except that a continuous metallic web $e$ (shown in Fig. 14) with perforations or roughened surface $h$ over its entire area is used instead of metallic members $d$, Figs. 1 and 2.

In Fig. 3, $e$ is shown lowest in section at center of the beam, gradually increasing in height toward ends, which is thus proportioned to take the shear for a uniformly-distributed load on the beam.

S, Figs. 3 and 4, show ribs in the exterior surfaces of the beam toward the end where the shear on the beam is greatest, which is for the purpose of lending increased stiffness to the web $b$ of the beam when it is deemed necessary.

Fig. 5 is a view looking upward at the lower flange of a beam having separate metallic tension members, showing the increase of these members from the ends of the beam toward the center, where they are greatest.

$m$, Fig. 5, shows a metallic washer or plate at the end of a beam, through which cords $c$ and $c'$, Fig. 1, may extend and be made fast when desired.

Figs. 6 and 7 show side elevations, Figs. 8 and 9 show top views, and Fig. 10 shows end views, respectively, of metallic members shown in Figs. 1 and 2, where like letters designate similar parts.

In Figs. 6, 7, 8, 9, and 10 the metallic parts are generally represented as made up of twisted wire or twisted bars to give the roughness of surface necessary for the exterior material composing the beam to adhere to; but this character of metal is not strictly necessary, as any metallic surfaces which are made sufficiently rough will answer the purposes. The connections between members $c$ and $c'$ and members $d$ are shown as a simple twisting of the parts composing $d$ through an eye or loop in $c$ or $c'$, which connection would not be sufficient if it were not for the solid exterior filling $b$, Fig. 2, which connects and maintains all parts in a rigid position. It is evident that any of the various means employed for connecting metallic members together may be used in connecting $d$ with $c$ and $c'$.

Fig. 12 shows various sections of beams, previously described, placed close together side by side, as would be used to form a continuous floor or foundation.

$t$, Fig. 12, shows means for applying an extra covering to the flanges of these beams when such covering is desirable.

Fig. 13 shows a continuous metallic web and flange $e$, bent so as to form a mold to receive the other composition forming beam, the lower metallic flange being strengthened by members $w$. The metallic web may continue the full length of beam with the same size section, as shown in Fig. 13, or it may be less in height toward the center of the beams, as shown in $e$, Fig. 14.

Fig. 14 is a detail of the beam.

Fig. 15 shows a side elevation, and Fig. 16 an end view, of a beam composed of a thin metallic I-beam having upper and lower flanges $c$ and $c'$, respectively, with web $d$ extending the full length of the beam. This metallic beam, having thin metal, which could not otherwise be used, is entirely embedded in and stiffened by the concrete or other material composing the exterior portion of the solid composite beam.

The lower metallic flange $c'$, Fig. 16, may be strengthened by adding metallic members $w$. The upper flange $c$, Figs. 15 and 16, will be designed to carry the principal part of the compressive stresses to which the beam will be subjected.

Fig. 17 shows a detail for making up the iron or metallic frame shown in Fig. 1.

The beams above described may be used in almost all places in building and foundation construction where quiescent loads are to be carried and may be used the same as iron and steel beams with similar sections. A single beam may be used, forming a single-beam girder, or two or more beams may be used together connected with separators similarly to double or multiple steel beam girders. These beams are especially adapted to foundation work, where they are protected from moisture by the exterior material composing the beam. The whole beam is to be formed and made solid by exterior pressure and can when completed be transported from the manufactory to any place ready for use.

Having substantially described my invention, what I claim as original, and desire to secure by Letters Patent, is—

1. A floor construction composed of concrete or similar substance, strengthened by metallic members as required, formed in the shape of a succession of eye (I) shaped beams placed with their upper flanges close together, in the manner and for the purpose specified.

2. A floor construction composed of separate concrete or similarly-constructed beams each with a comparatively thin web connected with flanges, the upper and thicker flanges forming the floor and the lower flanges forming the ceiling; substantially as specified.

3. A floor construction formed of concrete or similar beams having comparatively thin webs connected with upper flanges placed close together and having smaller lower flanges prepared to receive ceiling-blocks to go between same substantially as shown.

4. An eye (I) or deck (T) shaped beam formed of concrete or a similar substance having for the strengthening of the web $b$ ribs $s$ extending across the web substantially as shown.

5. Composite beams of substantially I form placed side by side to form floors or similar structures, the flanges of the beams being separated, and the space between said flanges being filled with blocks which are held in position by said flanges.

6. Composite flanged beams placed side by side to form floors or similar structures, the upper flanges of the beams being of unequal thickness throughout the length of the beam, the thickest part of the flange being where the stresses on said flanges are greatest, and gradually diminishing in thickness to the parts of the flange where the stresses on the flanges are least.

GUY B. WAITE.

Witnesses:
JOHN I. WELLER,
ALFRED H. HERZOGG.